(12) United States Patent
Kim et al.

(10) Patent No.: US 11,295,782 B2
(45) Date of Patent: Apr. 5, 2022

(54) TIMED ELEMENTS IN VIDEO CLIPS

(71) Applicant: Meta Platforms, Inc., Menlo Park, CA (US)

(72) Inventors: Junsik Kim, San Francisco, CA (US); Martin A. Ortega, Oakland, CA (US); Ian McIntyre Silber, San Francisco, CA (US); Hyun Woo Jung, Burlingame, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/828,844

(22) Filed: Mar. 24, 2020

(65) Prior Publication Data
US 2021/0304797 A1    Sep. 30, 2021

(51) Int. Cl.
| | | |
|---|---|---|
| *G11B 27/00* | (2006.01) | |
| *H04N 9/80* | (2006.01) | |
| *G11B 27/034* | (2006.01) | |
| *G11B 27/34* | (2006.01) | |
| *H04N 5/262* | (2006.01) | |
| *H04N 5/272* | (2006.01) | |

(52) U.S. Cl.
CPC ............ *G11B 27/034* (2013.01); *G11B 27/34* (2013.01); *H04N 5/2628* (2013.01); *H04N 5/272* (2013.01)

(58) Field of Classification Search
USPC ................ 386/282, 280, 278, 285, 239, 248
See application file for complete search history.

(56) References Cited

U.S. PATENT DOCUMENTS

| | | | |
|---|---|---|---|
| 6,597,375 B1 * | 7/2003 | Yawitz ................. | G11B 27/034 715/723 |
| 7,890,867 B1 * | 2/2011 | Margulis .............. | G11B 27/034 715/723 |
| 8,543,922 B1 | 9/2013 | Niles et al. | |
| 8,842,975 B2 * | 9/2014 | Cho ........................ | G11B 20/10 386/282 |
| 2007/0292106 A1 * | 12/2007 | Finkelstein ............ | G11B 27/28 386/241 |
| 2008/0036917 A1 * | 2/2008 | Pascarella ............ | H04N 21/854 348/702 |
| 2009/0129741 A1 * | 5/2009 | Kim ....................... | G11B 27/34 386/328 |

(Continued)

OTHER PUBLICATIONS

EPO—Extended European Search Report for related European application No. 21155196.5 dated Jun. 11, 2021; 9 pages.

(Continued)

*Primary Examiner* — Daquan Zhao
(74) *Attorney, Agent, or Firm* — McDermott Will & Emery LLP

(57) ABSTRACT

Various aspects of the subject technology relate to systems, methods, and machine-readable media for editing video clips. The method includes displaying a preview of a video clip through a user interface. The method also includes adding a timed element to the video clip through the user interface. The method also includes adjusting a timing for the timed element through an adjustable timeline, the adjustable timeline based on a length of the video clip. The method also includes adjusting a location of the timed element in the video clip. The method also includes finalizing the video clip to include the timed element.

18 Claims, 20 Drawing Sheets

(56) References Cited

U.S. PATENT DOCUMENTS

| 2012/0188411 | A1* | 7/2012 | Jang | ............ | H04N 5/2621 |
| | | | | | 348/239 |
| 2015/0358550 | A1* | 12/2015 | Faber | ............ | H04M 1/72555 |
| | | | | | 348/333.02 |
| 2016/0266726 | A1 | 9/2016 | Zhan et al. | | |
| 2019/0347318 | A1* | 11/2019 | Howell | ............ | G06T 11/60 |

OTHER PUBLICATIONS

Meyers, E., "How to Add Closed Captions and Subtitles to TikTok Clips," Jan. 23, 2020, retrieved from www.rev.com/blog/how-to-add-closed-captions-and-subtitles-to-tiktok-clip on Jul. 8, 2020, 16 pp.

* cited by examiner

TIMED ELEMENTS IN VIDEO CLIPS

TECHNICAL FIELD

The present disclosure generally relates to editing video clips, and more particularly to adding timed elements to portions of video clips.

BACKGROUND

Videos are a popular way of communicating information and providing entertainment to people. Video-sharing services allow video clips to be recorded and shared with a network of users. The video clips may be edited for a variety of purposes prior to being shared. Unfortunately, conventional video-sharing services provide limited video editing capabilities.

BRIEF SUMMARY

The subject disclosure provides systems and methods for editing video clips. According to aspects, a user is allowed to add a timed element to a portion of a video clip. For example, the timed element may correlate to the portion of the video clip to add context.

According to one embodiment of the present disclosure, a computer-implemented method for editing video clips is provided. The method includes displaying a preview of a video clip through a user interface. The method also includes adding a timed element to the video clip through the user interface. The method also includes adjusting a timing for the timed element through an adjustable timeline, the adjustable timeline based on a length of the video clip. The method also includes adjusting a location of the timed element in the video clip. The method also includes finalizing the video clip to include the timed element.

According to one embodiment of the present disclosure, a system is provided including a processor and a memory comprising instructions stored thereon, which when executed by the processor, causes the processor to perform a method for editing video clips. The method includes displaying a preview of a video clip through a user interface. The method also includes adding a timed element to the video clip through the user interface. The method also includes adjusting a timing for the timed element through an adjustable timeline, the adjustable timeline based on a length of the video clip. The method also includes adjusting a location of the timed element in the video clip. The method also includes finalizing the video clip to include the timed element.

According to one embodiment of the present disclosure, a non-transitory computer-readable storage medium is provided including instructions (e.g., stored sequences of instructions) that, when executed by a processor, cause the processor to perform a method for editing video clips. The method includes displaying a preview of a video clip through a user interface. The method also includes adding a timed element to the video clip through the user interface. The method also includes adjusting a timing for the timed element through an adjustable timeline, the adjustable timeline based on a length of the video clip. The method also includes adjusting a location of the timed element in the video clip. The method also includes finalizing the video clip to include the timed element.

According to one embodiment of the present disclosure, a system is provided that includes means for storing instructions, and means for executing the stored instructions that, when executed by the means, cause the means to perform a method for editing video clips. The method includes displaying a preview of a video clip through a user interface. The method also includes adding a timed element to the video clip through the user interface. The method also includes adjusting a timing for the timed element through an adjustable timeline, the adjustable timeline based on a length of the video clip. The method also includes adjusting a location of the timed element in the video clip. The method also includes finalizing the video clip to include the timed element.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Videos are a popular way of communicating information and providing entertainment to people. Video-sharing services allow video clips to be recorded and shared with a network of users. The video clips may be edited for a variety of purposes prior to being shared. Unfortunately, conventional video-sharing services provide limited video editing capabilities.

The subject disclosure provides for systems and methods for editing video clips. A user is allowed to edit a previously recorded video clip of a series of video clips without having to re-record any of the video clips. For example, the video clips may be trimmed to improve continuity of the series of video clips.

The disclosed system addresses a problem in traditional video editing tied to computer technology, namely, the technical problem of editing a previously recorded video clip of a series of video clips. The disclosed system solves this technical problem by providing a solution also rooted in computer technology, namely, by providing for the ability to edit a previously recorded clip without re-recording anything. The disclosed subject technology further provides improvements to the functioning of the computer itself because it reduces processing and bandwidth costs associated with conventional video editing technology.

Figure 1A:
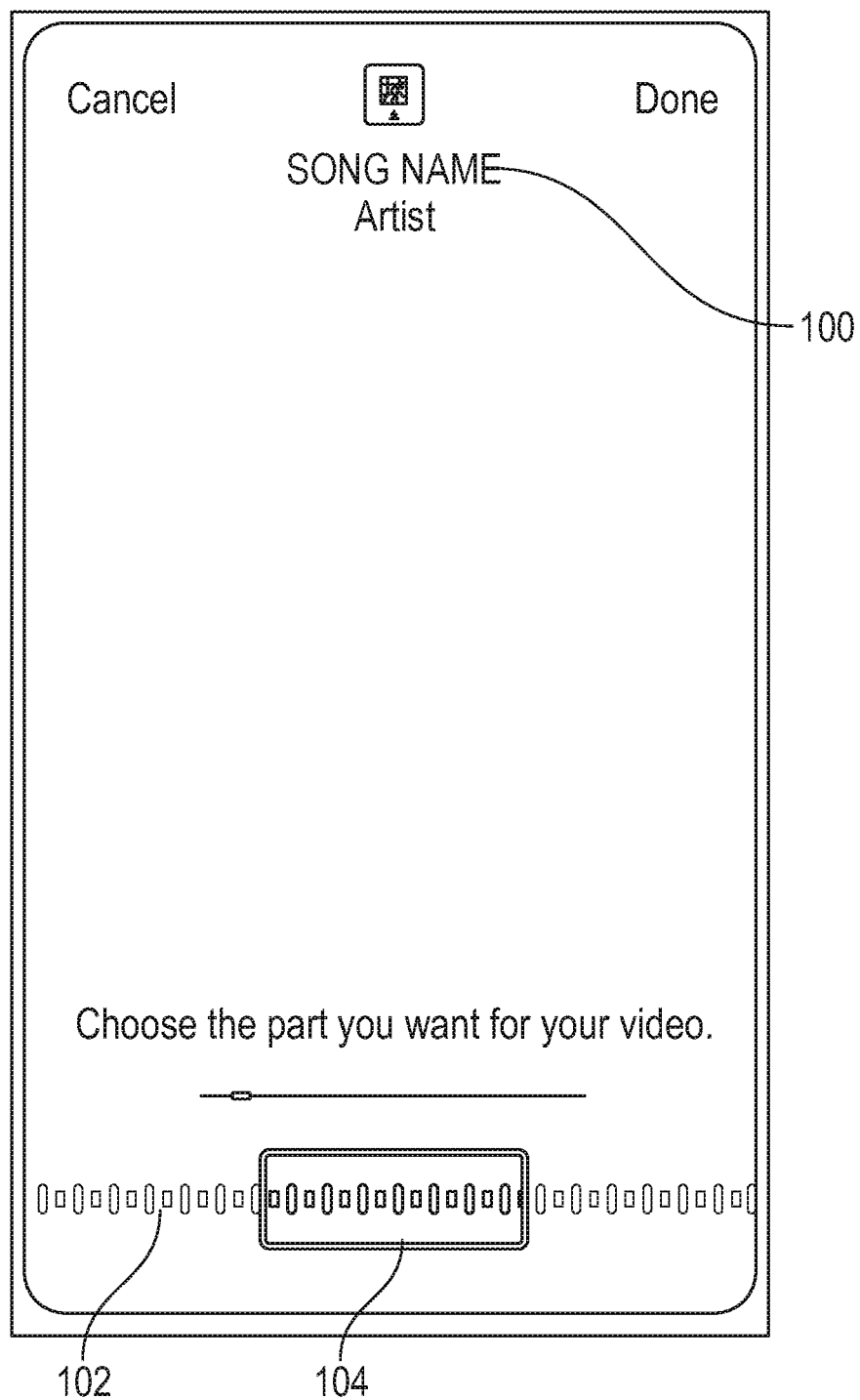
FIGS. 1A-1D illustrate exemplary video clip recording tools, according to certain aspects of the present disclosure.

FIGS. 1A-1D illustrate exemplary video clip recording tools, according to certain aspects of the present disclosure. Referring to FIG. 1A, a user interface for adding a song 100 to a video clip is illustrated. For example, a user may select the song 100 from a playlist or other source to include with a recorded video clip. The user interface may display a song title and artist name once the song 100 is selected. The user may also select a portion 104 of the song 100 to use. The user interface may display beats 102 of the song 100 to aid the user in determining which portion of the song 100 to use. For example, the beats 102 may aid in correlating the video clip to a desired portion 104 of the song 100 (e.g., a portion where the beat drops, certain lyrics occur, etc.). According to aspects, the user interface may be configured to display lyrics of the song 100 for the selected portion 104.

Figure 1B:
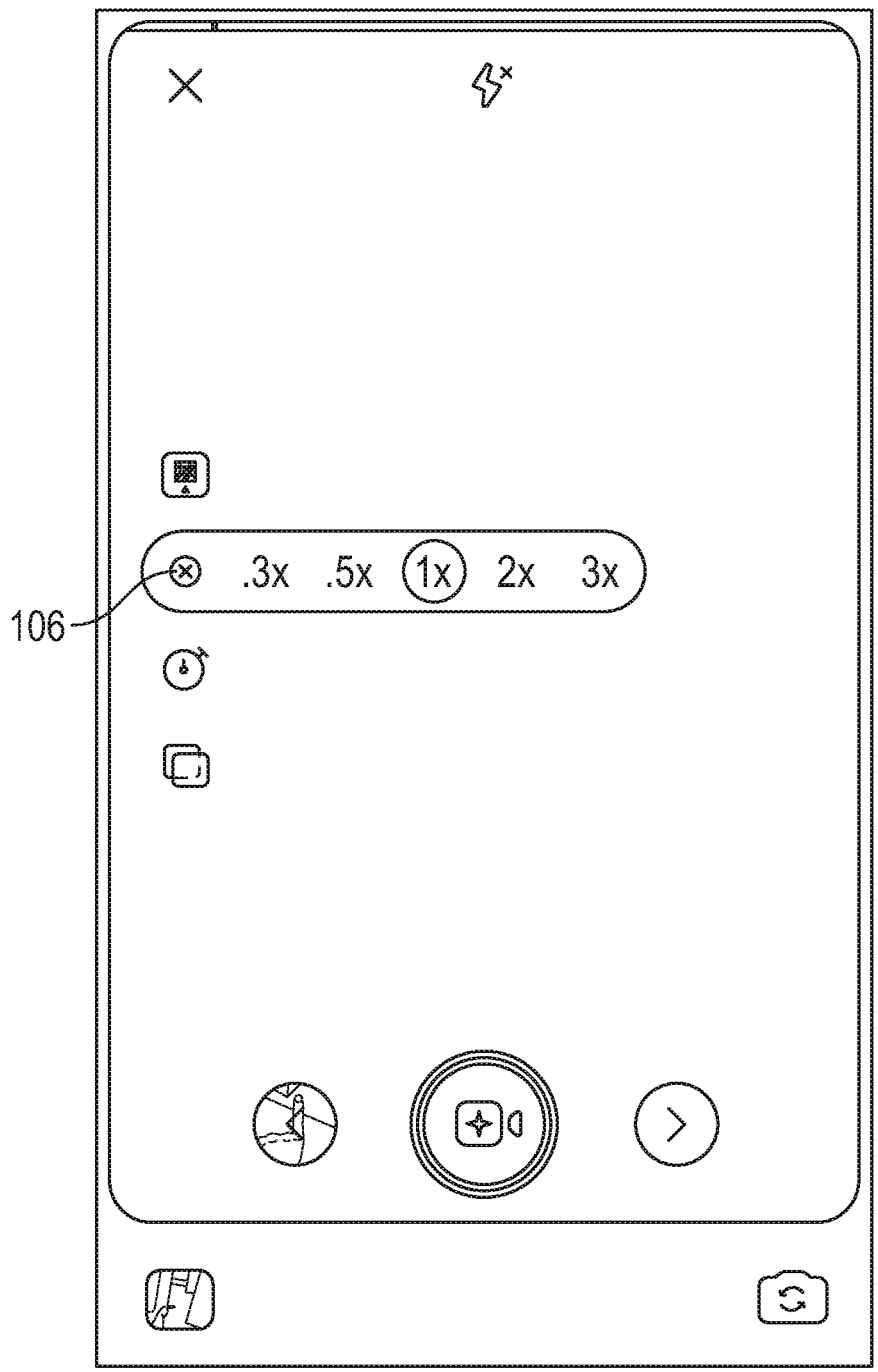

FIG. 1B illustrates a user interface for adjusting a recording speed 106, according to certain aspects. For example, the recording speed 106 may allow a user to add a slowing or speeding up effect to a video clip being recorded. In an implementation, the user may select between several recording speeds 106, including, but not limited to, 0.3×, 0.5×, 1×, 2×, and 3×. For example, 0.3× would record at one-third of a normal speed, 0.5× would record at half of the normal speed, 1× would record at the normal speed, 2× would record at twice the normal speed, and 3× would record at three times the normal speed.

According to aspects, recording at one-third the normal speed (e.g., 0.3×) would cause the video clip to play three times faster than normal. Similarly, recording at half the normal speed (e.g., 0.5×) would cause the video clip to play twice as fast as normal. According to aspects, recording at twice the normal speed (e.g., 2×) would cause the video clip to play two times slower than normal. Similarly, recording at three times the normal speed (e.g., 3×) would cause the video clip to play three times slower than normal.

According to aspects, pre-recorded video clips may be loaded from a digital photo album. The recording speed 106 of the pre-recorded video clips may also be adjusted, even though the pre-recorded video clip may have been recorded at normal speed.

Figure 1C:
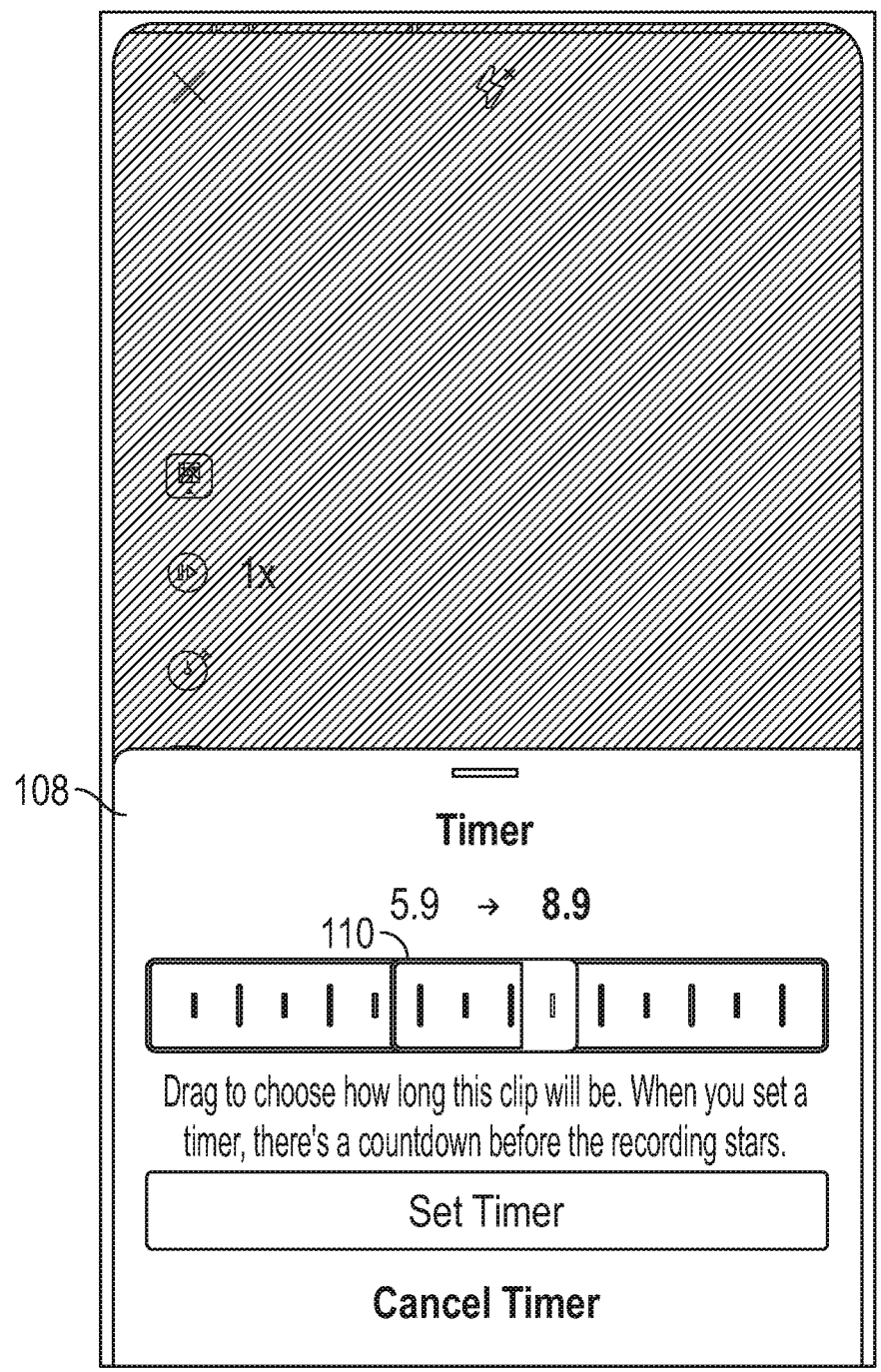

FIG. 1C illustrates a user interface for setting a timer 108 for recording a timed video clip. For example, the user may specify a length 110 for a timed recording. Upon setting the length 110, a countdown may be displayed that gives the user some time to prepare for the timed recording. For example, a three second countdown may be displayed. It is understood that the countdown may be adjustable based on user preferences.

According to aspects, the length 110 of the timed recording may be limited by a total allowable length for each video clip. For example, each video clip may be 30 seconds or shorter. According to aspects, the length 110 of the timed recording may be limited by a total allowable length for a series of video clips. For example, a total length for the series of video clips may be set by an administrator to not exceed two minutes. As a result, the length 110 of the timed recording may be limited by the lengths of the video clips that came before.

Figure 1D:
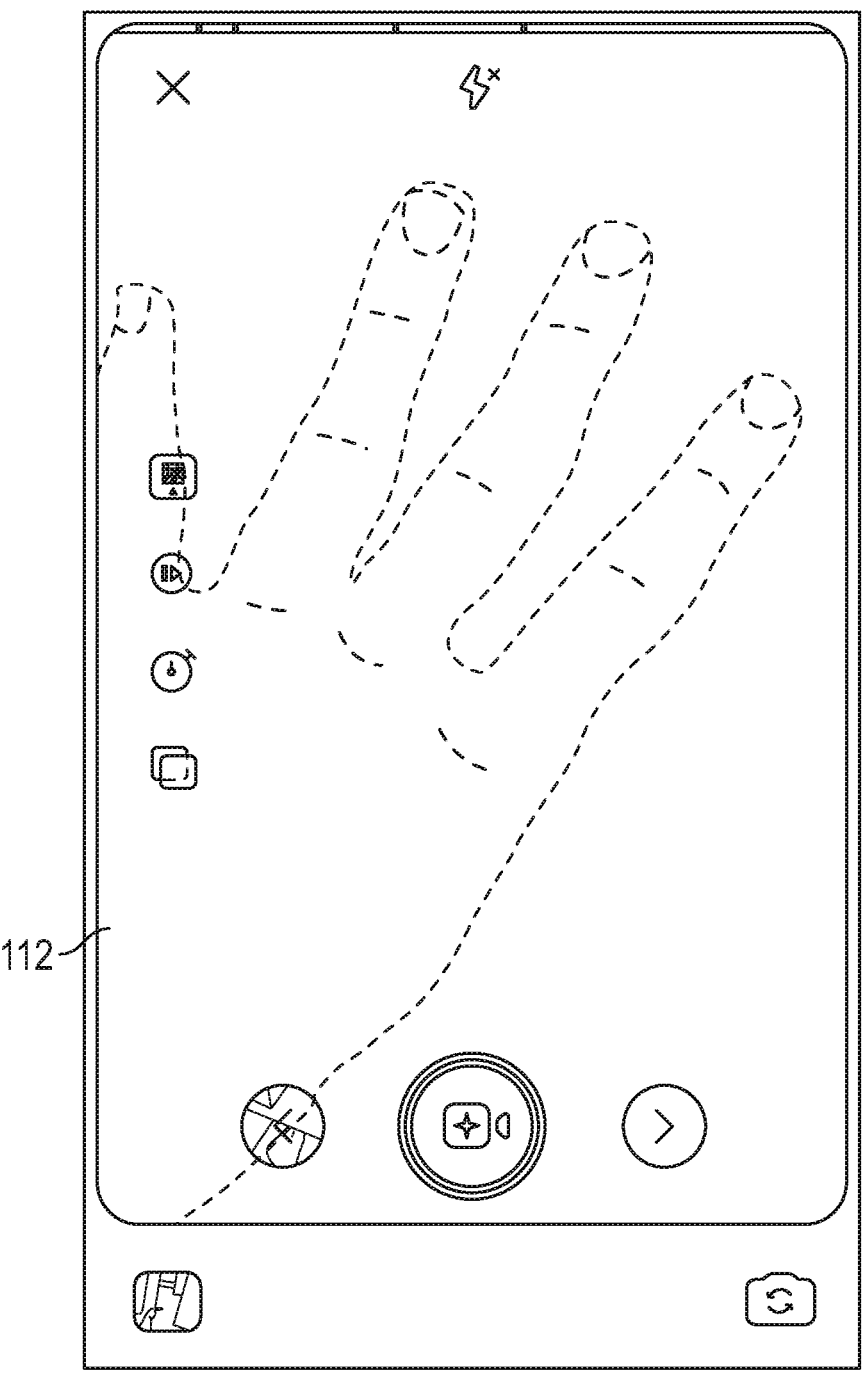

FIG. 1D illustrates a silhouette 112 that may be generated to aid in recording of a next video clip. For example, the silhouette 112 may be generated based on a last frame of a last recorded video clip. The silhouette 112 may be overlaid on the user interface so that the user may utilize the silhouette 112 as a guide to match up certain features of the last recorded video clip with the next video clip yet to be recorded.

As illustrated, the silhouette 112 may be a hand of the user from the last recorded video clip. The user may line up their hand with the silhouette 112 so that there will be continuity in the hand placement/orientation when the next video clip is recorded. It is understood that the silhouette 112 may include all features from a last frame of a previously recorded clip. According to aspects, the silhouette 112 may be displayed as a "ghost" of the last frame of the previously recorded clip (e.g., see-through).

Figure 2A:
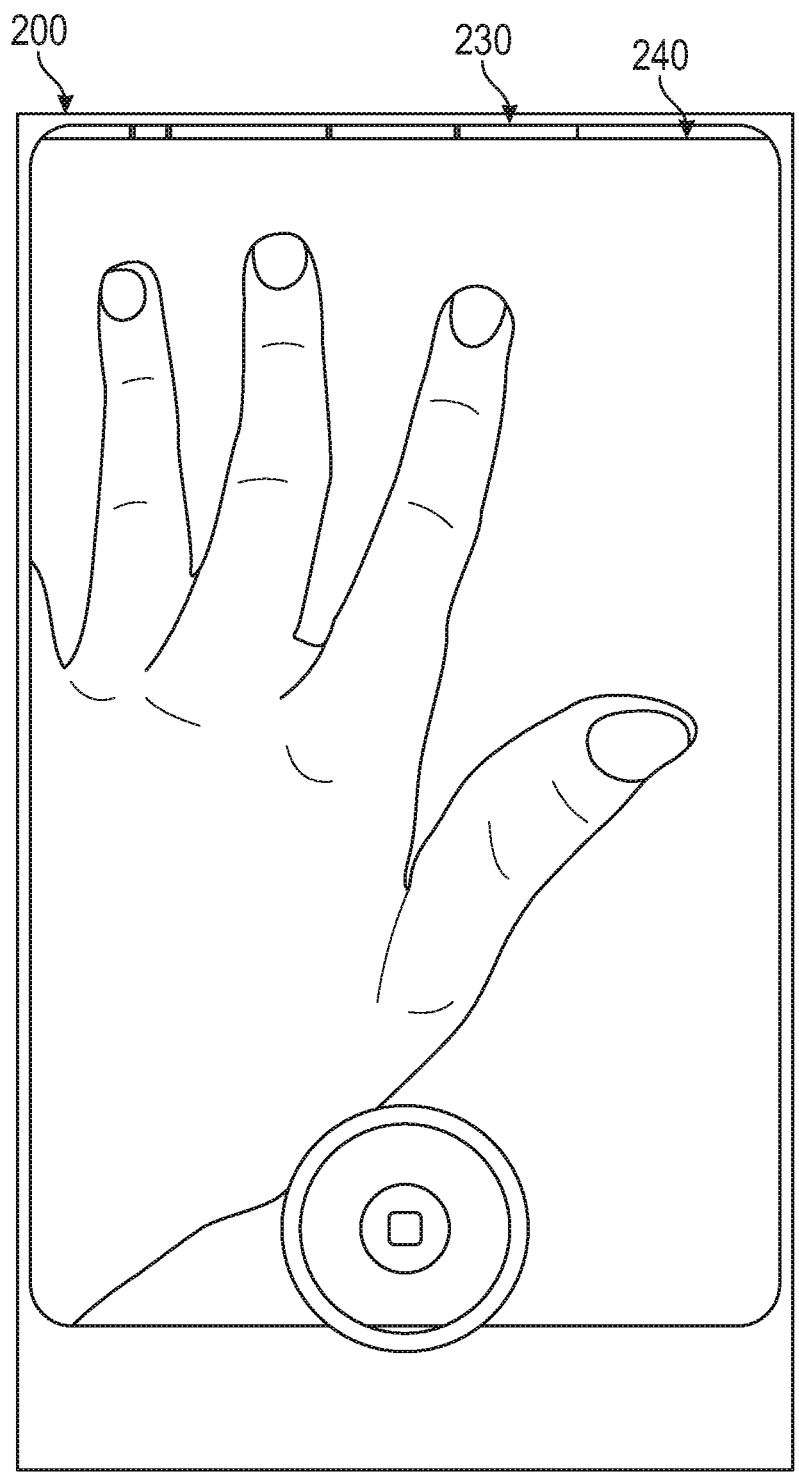
FIGS. 2A-2D illustrate exemplary video clip editing tools, according to certain aspects of the present disclosure.

FIGS. 2A-2D illustrate exemplary video clip editing tools, according to certain aspects of the present disclosure. Referring to FIG. 2A, a video capture user interface is displayed. As illustrated, a user may be recording movements of their hand. A timeline 200 may show how many video clips were previously recorded in a series of video clips. The timeline 200 may also show a total length 230 of the series of video clips, which may include the video clip currently being recorded.

According to aspects, the timeline 200 may also show how much time is left 240 before a maximum video length is reached. For example, the maximum video length may be determined by an administrator. The maximum video length may be visually displayed along a top width of the user interface. For example, the width of the user interface may span across a display width of a user device. Therefore, once the recording length spans the entire width of the user device, the user would know that the maximum video length has been reached.

Figure 2B:
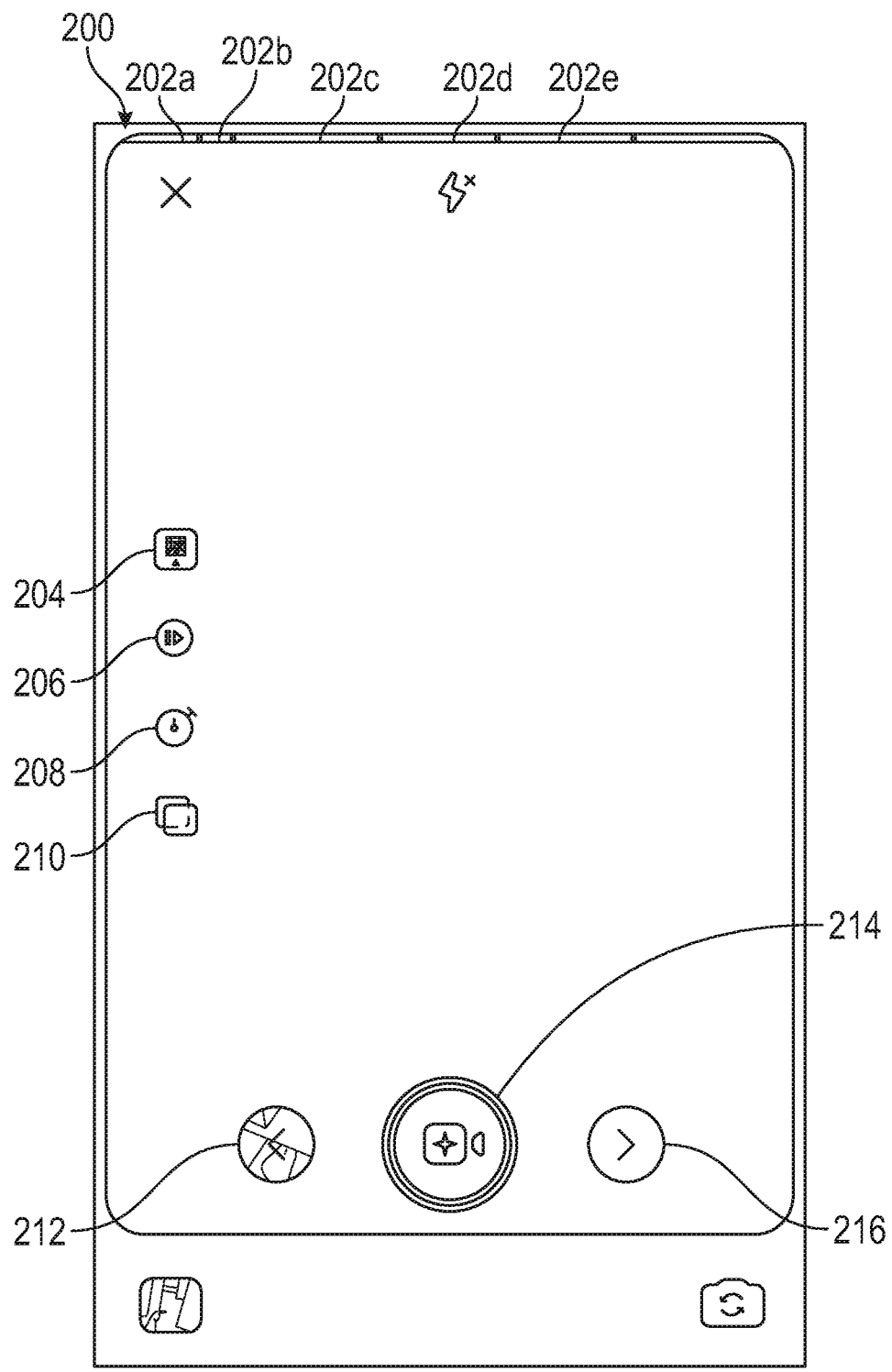

FIG. 2B illustrates an intermediate user interface, which may be displayed between video clip takes. For example, the intermediate user interface may include icons for adding music 204, adjusting a recording speed 206, adding a timer 208, and adding a silhouette 210, as described above in relation to FIGS. 1A-1D.

The intermediate user interface may also display the timeline 200, as described above in FIG. 2A. As illustrated, the timeline 200 may include information regarding a series of video clips that have already been recorded. For example, the timeline 200 may include a first video clip 202a, a second video clip 202b, a third video clip 202c, a fourth video clip 202d, and a fifth video clip 202e (e.g., a latest video clip). The fifth video clip 202e may be the most recently recorded video clip of the series of video clips (e.g., video clips 202a-202e). A length of each of the video clips 202a-202e may illustrate how long each video clip is in relation to the other video clips.

According to aspects, the intermediate user interface may also include an editing icon 212, a recording icon 214, and a stitching icon 216. For example, toggling the editing icon 212 allows the user to edit the latest video clip, which in this case would be the fifth video clip 202e. According to aspects, the editing icon 212 may display a thumbnail view of a portion of the latest video clip. In an implementation, toggling the recording icon 214 would allow the user to record another video clip (e.g., a next video clip) to be added to the series of video clips 202a-202e. Finally, toggling the stitching icon 216 would cause the series of video clips 202a-202e to be stitched together to finalize the video clip.

Figure 2C:
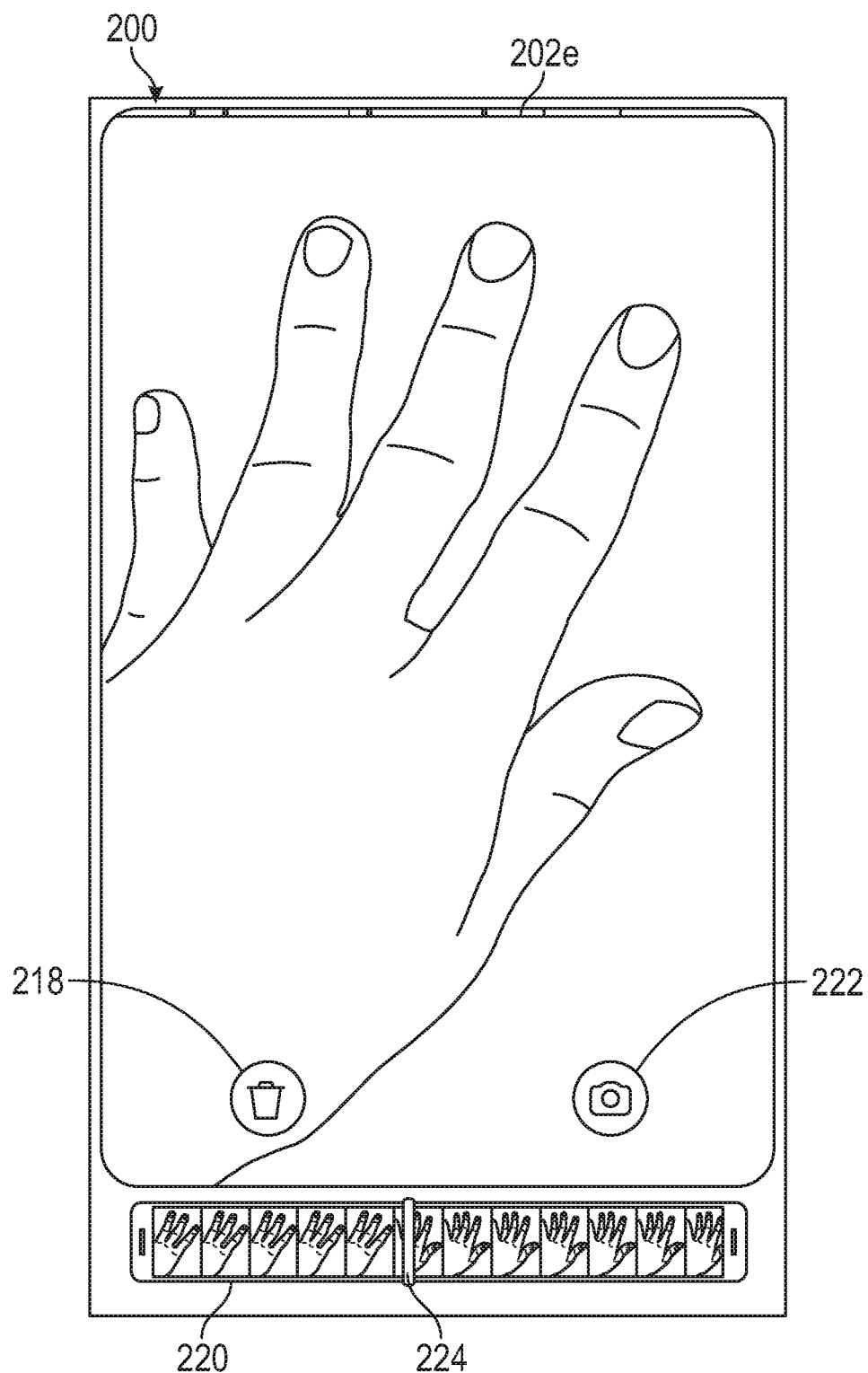

FIG. 2C illustrates a user editing interface for editing the latest video clip (e.g., the fifth video clip 202e). According to aspects, an editing timeline 220 may be displayed that shows thumbnail views of various portions of the latest video clip. A slider 224 may be utilized to navigate the latest video clip. Alternatively, the user may press and hold a screen of a user device, and may swipe left or right to navigate the latest video clip.

Figure 2D:
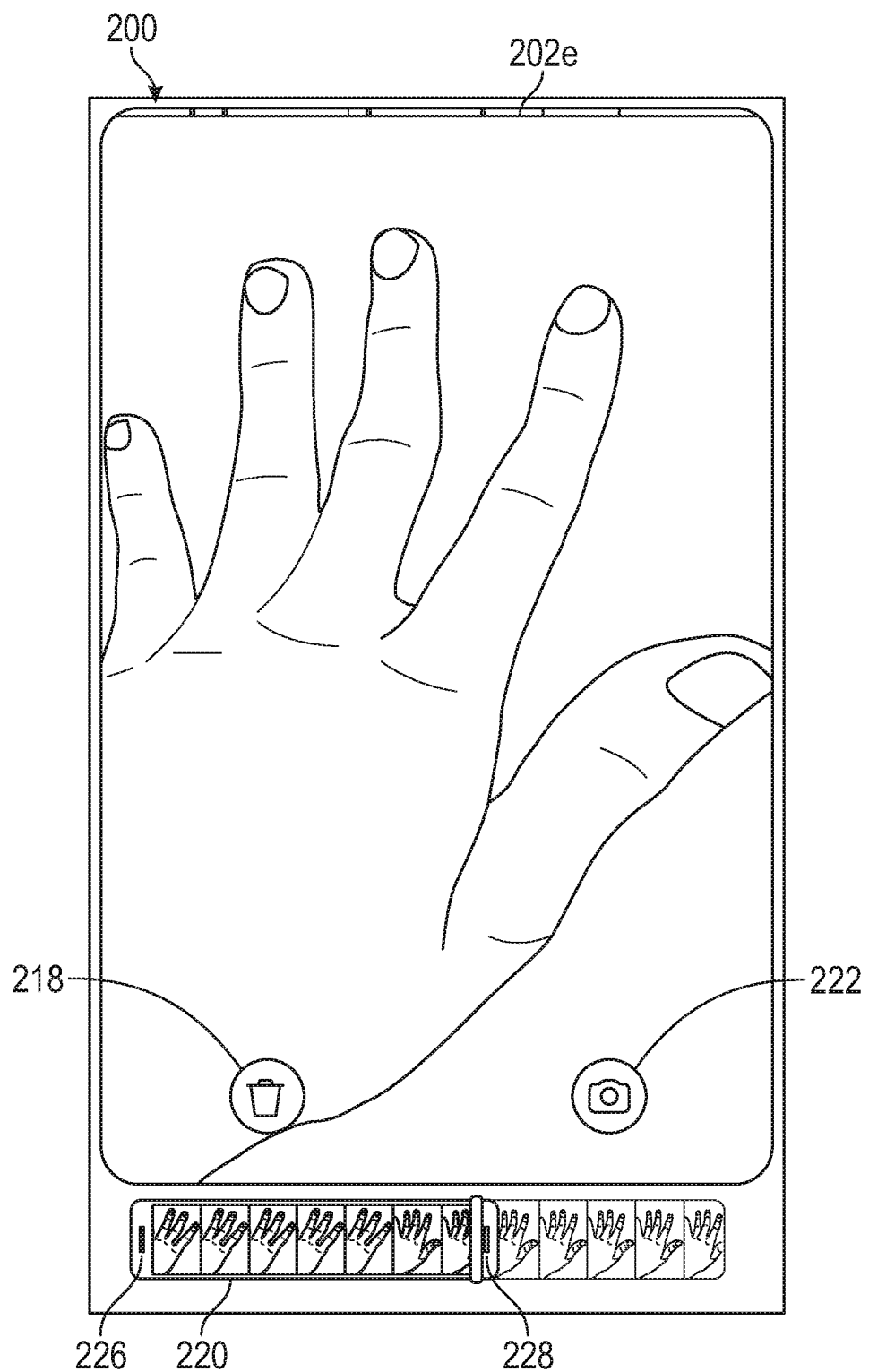

The timeline 200 may display the latest video clip 202e in relation to the rest of the video clips (e.g., video clips 202a-202d). According to aspects, the latest video clip 202e may be trimmed. Referring to FIG. 2D, the editing timeline 220 may be adjusted from a first end 226 (e.g., proximate to a beginning of the video clip) or a second end 228 (e.g., proximate to an ending of the video clip) to trim the video clip 202e. As the video clip 202e is trimmed, the timeline 200 is updated accordingly to reflect the trimmed length.

As illustrated in FIGS. 2C and 2D, the user editing interface may also include a delete icon 218 and an accept icon 222. Toggling the delete icon 218 would cause the video clip 202e to be deleted. Toggling the accept icon 222 would cause the edits to be implemented.

According to aspects, the trimmed portion(s) of the video clip may appear grayed out. If the user decides to un-trim the trimmed portions, they may adjust the editing timeline 220 accordingly to include the trimmed portions. According to aspects, the user may adjust the editing timeline 220 at will, by widening and/or narrowing the editing timeline 220. In this way, the video clip may be trimmed and/or un-trimmed based on the user's preference.

Figure 3A:
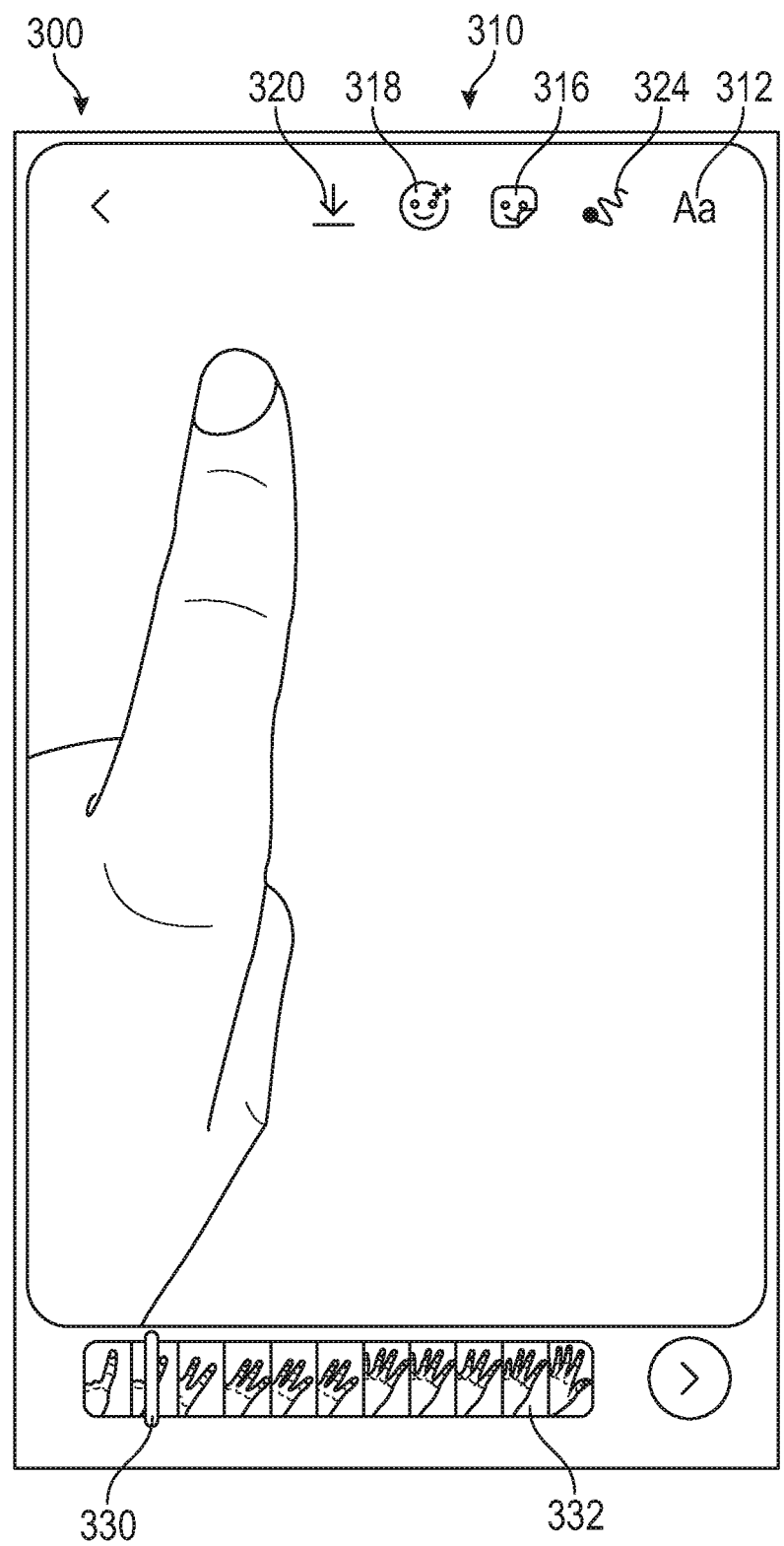
FIGS. 3A-3F illustrate exemplary video clip post-editing tools, according to certain aspects of the present disclosure.

FIGS. 3A-3F illustrate exemplary video clip post-editing tools, according to certain aspects of the present disclosure. Referring to FIG. 3A, a video clip may be previewed through a user interface 300. For example, the video clip may have been obtained through processes described above in FIGS. 1-2.

The user interface 300 may include functionality for adding timed elements 310. For example, the timed elements 310 may include text 312, a custom element 314, a sticker 316, and/or an animation 318. The custom element 314 may include a hand drawn element, such as a sketch or writing. A user may select, through the user interface 300, any of the timed elements 310 for adding to the video clip. The user interface 300 may also provide functionality for saving 320 the video clip.

According to aspects, the user interface 300 may include a video timeline 330 that displays thumbnails of the video clip at various instances. For example, a scroll bar 332 on the video timeline 330 may display which portion of the video clip is being played back. The scroll bar 332 may be utilized to scroll to a portion of the video clip. In an implementation, the video clip may play continuously in a loop for editing.

Figure 3B:
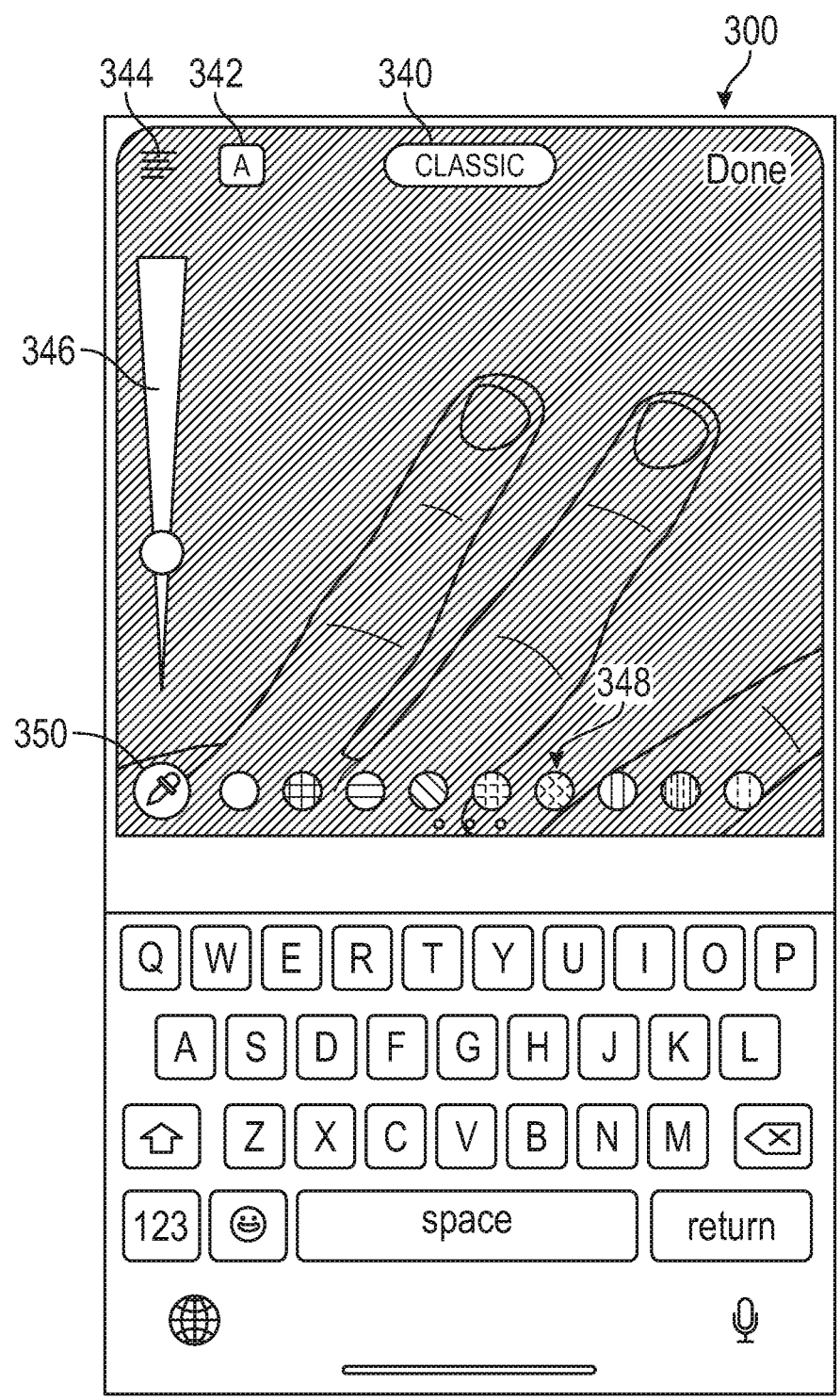

FIG. 3B illustrates adding text 312 to the video clip. For example, a user may toggle the icon for adding text 312 through the user interface 300 of FIG. 3A. The user may customize various aspects of the text 312, including a font 340, a backdrop 342, an alignment 344, a size 346, and a color 348. The alignment 344 may include options for left justified, right justified, centered, etc. For example, the color 348 may be copied from the video clip through a dropper 350. The text may be entered through a keyboard of the user interface 300. In an implementation, the size 346 may be selected through a slider, as illustrated in FIG. 3B.

Figure 3C:
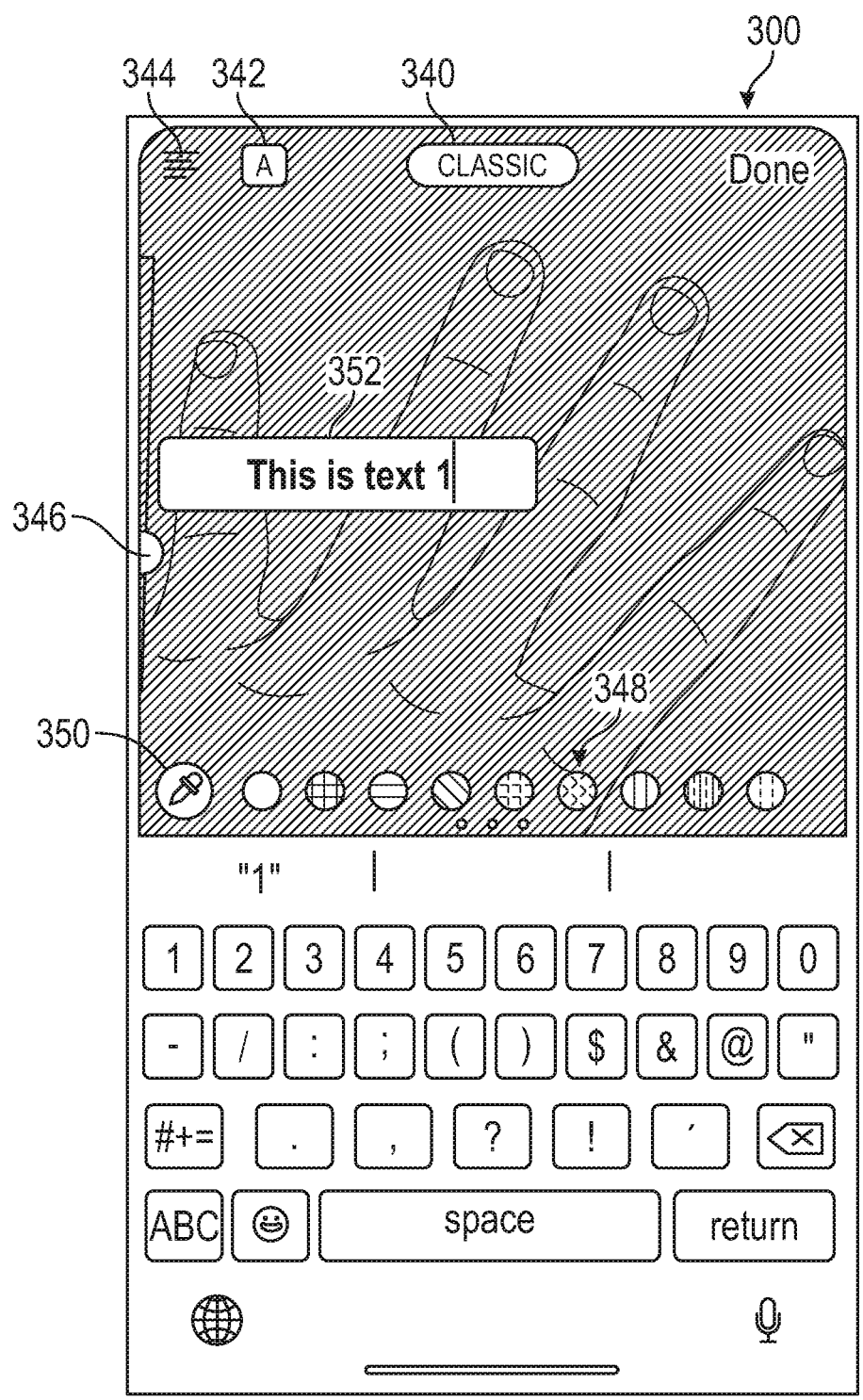

Referring to FIG. 3C, the user has added text 352 (e.g., a first timed element). For example, the text 352 may have been customized to include a black backdrop 342. The backdrop 342 may include other backdrop colors for selection. By including the backdrop 342, the content of the text 352 may be made visible to contrast with colors of the video clip.

Figure 3D:
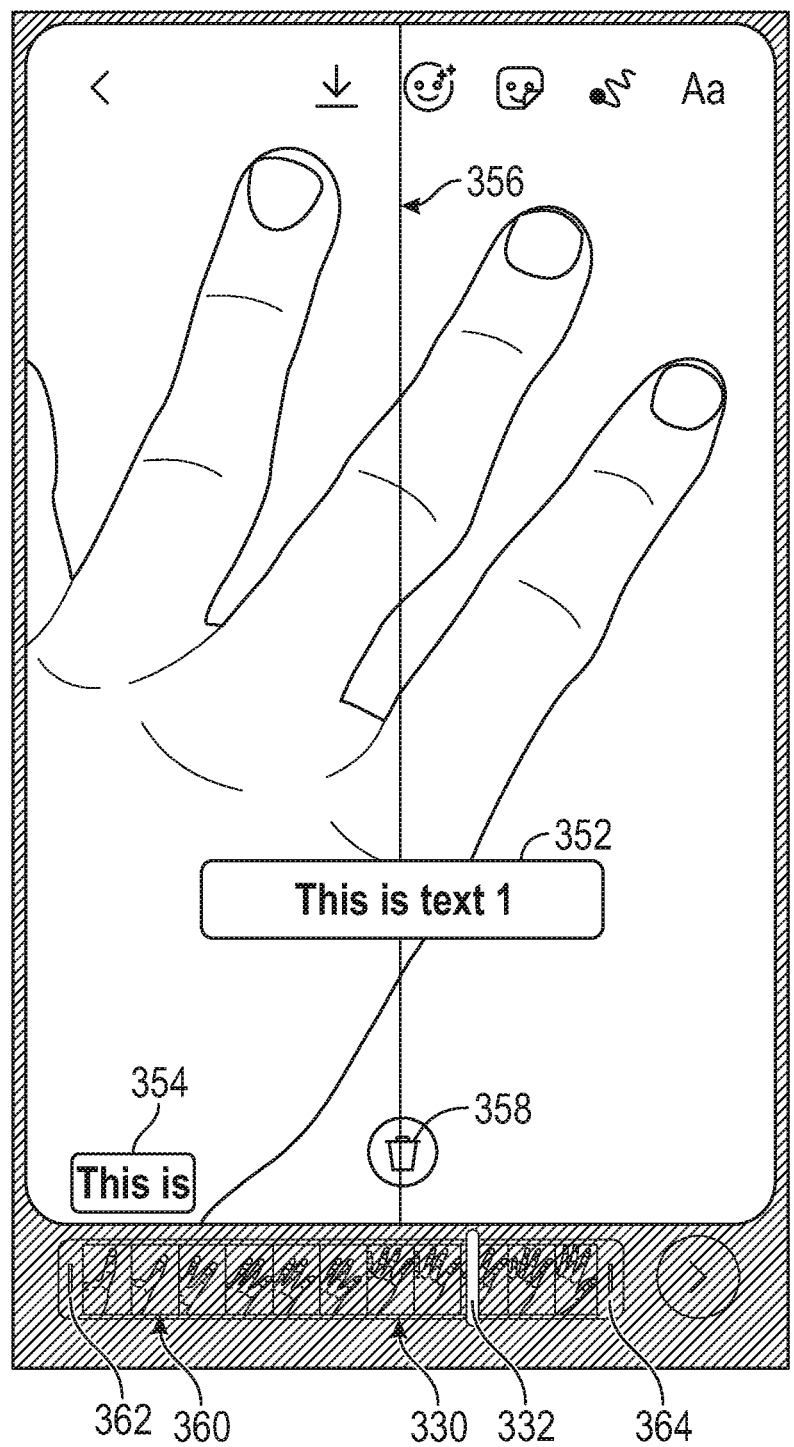

Referring to FIG. 3D, once the text 352 has been added, the user may drag the text 352 anywhere in relation to the video clip. For example, a centerline 356 may provide assistance in centering the text 352 on a screen. The centerline 356 may be configured to appear only when the text 352 is being dragged. In an implementation, dragging the text 352 to a delete icon 358 would delete the text 352.

According to aspects, movement of the text 352 as it is dragged along a path may be recorded. For example, the user may drag the text 352 such that it moves along a path. The path may be replicated to add movement to the timed element 310 based on the path.

According to aspects, a text icon 354 may appear above the video timeline 330 to allow for editing of the text 352. Additionally, a text timeline 360 (e.g., an adjustable timeline) may overlap with the video timeline 330 to allow for adjusting a timing of the text 352. For example, the text timeline 360 may include a first end 362 and a second end 364. The first end 362 may be proximate to a beginning portion of the video clip and the second end 364 may be proximate to an ending portion of the video clip. In an implementation, adjusting the first end 362 and the second end 364 toward each other provides for customization of the timing of the text 352. For example, the text 352 may only appear during portions of the video between the first end 362 and the second end 364.

Figure 3E:
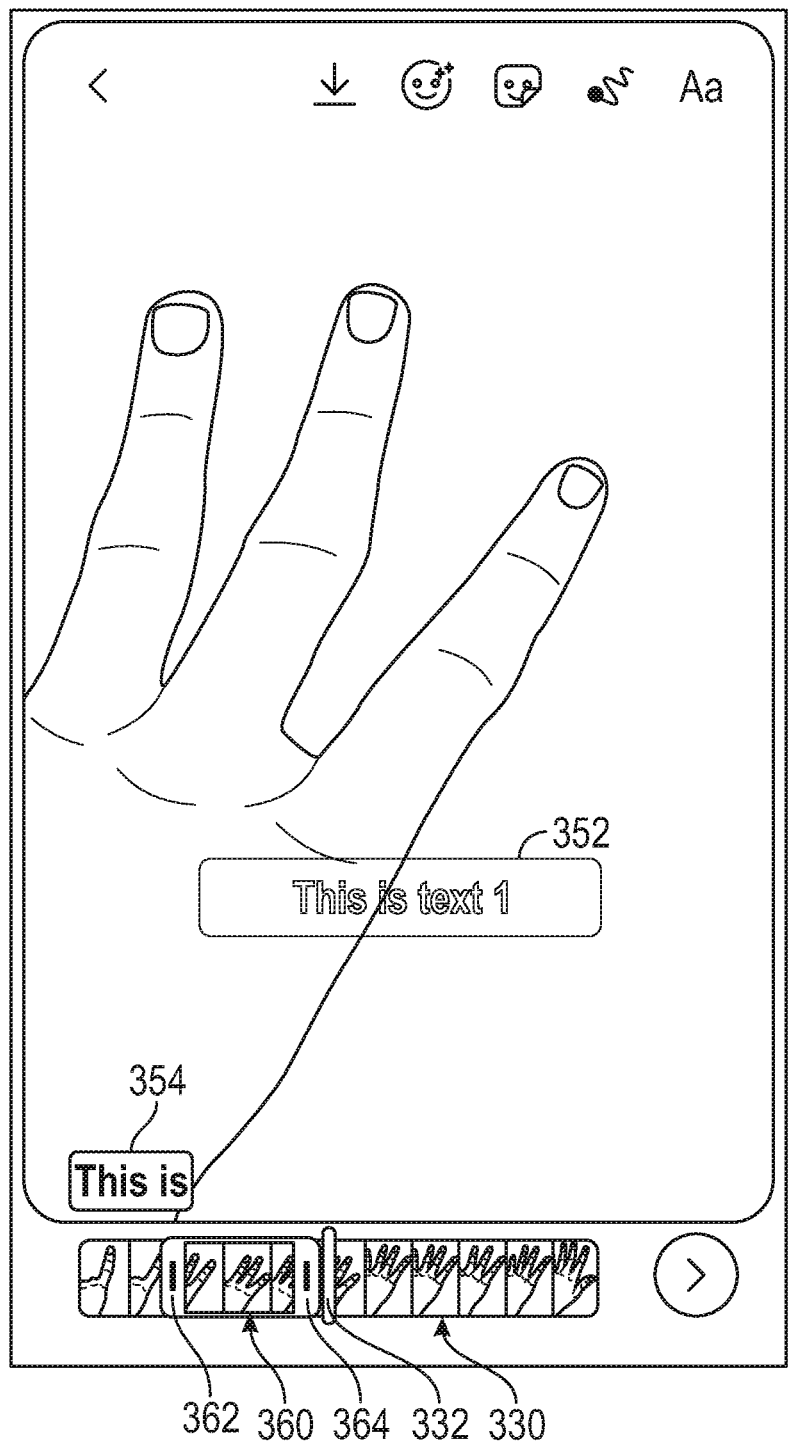

As illustrated in FIG. 3E, the text 352 has been moved to a center location of the video clip. Additionally, the first end 362 and the second end 364 of the text timeline 360 have been adjusted such that the text 352 only appears near a beginning portion of the video clip. As shown, the scroll bar 332 has progressed past the second end 364 of the text timeline 360. As a result, the text 352 may be configured to appear see-through. This is because the text 352 is not configured to appear during this portion of the video clip. By allowing the user to see the text 352 as see-through, the user may coordinate locations and/or content of additional timed elements 310 in relation to the text 352.

Figure 3F:
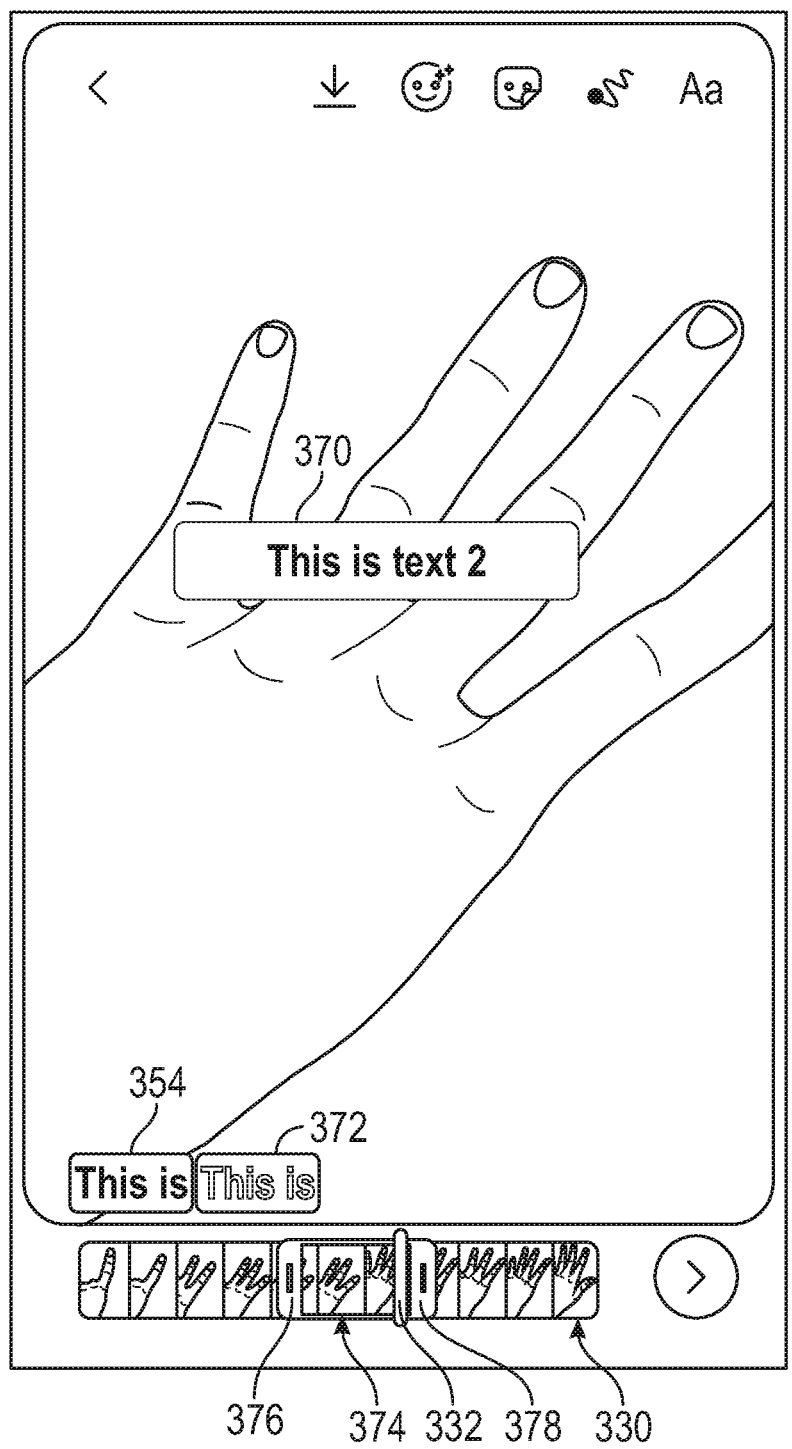

Referring to FIG. 3F, the user has added text 370 (e.g., a second timed element). For example, the text 370 may be configured to be displayed after the text 352. As illustrated, the video timeline 330 is displaying a second text timeline 374 that correlates to the second text 370. A second text icon 372 has also been generated next to the first text icon 354. In an implementation, toggling the first text icon 354 would display the first text 352 along with the first text timeline 360. Similarly, toggling the second text icon 372 would display the second text 370 along with the second text timeline 374.

As illustrated, the second text icon 372 has been toggled, and so the second text 370 and the second text timeline 374 are displayed. According to aspects, the second text timeline 374 may also include a first end 376 and a second end 378. As shown in FIG. 3F, the scroll bar 332 of the video timeline 330 is within the first end 376 and the second end 378 of the second text timeline 374. As a result, the second text 370 is displayed as it would appear in a finalized video. Adjusting the first end 376 and the second end 378 of the second text timeline 374 would also adjust a timing for the second text 370. This is because the second text 370 is configured to appear only within the first end 376 and the second end 378 of the second text timeline 374.

It is understood that although texts have been illustrated as being added as timed elements, any of the custom element 314, sticker 316, and/or animation 318 may also be similarly added. It is further understood that any combination of the timed elements 310 may be included without departing from the scope of the disclosure.

Figure 4A:
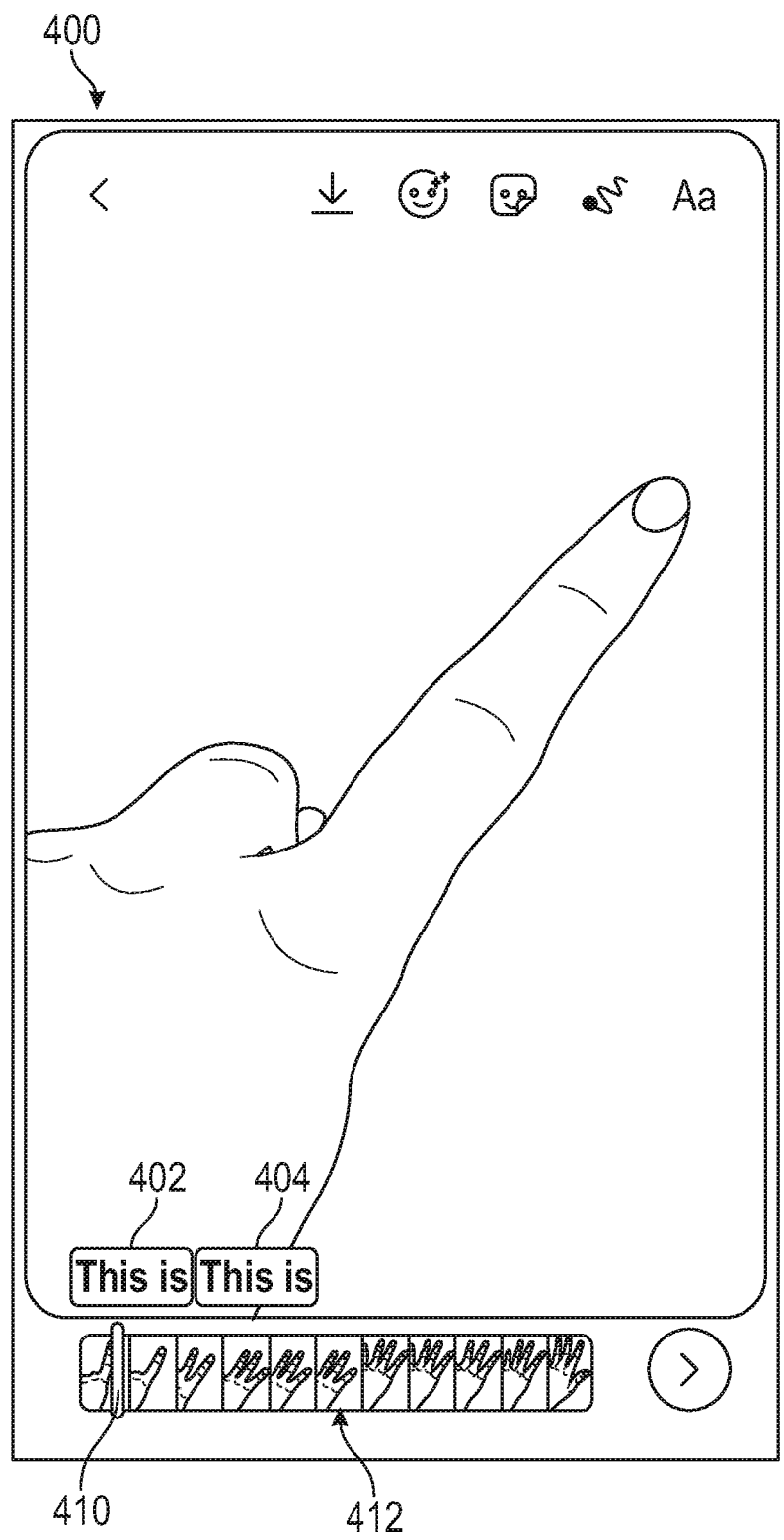
FIGS. 4A-4C illustrate exemplary post-editing playback of a video clip, according to certain aspects of the present disclosure.
Figure 4B:
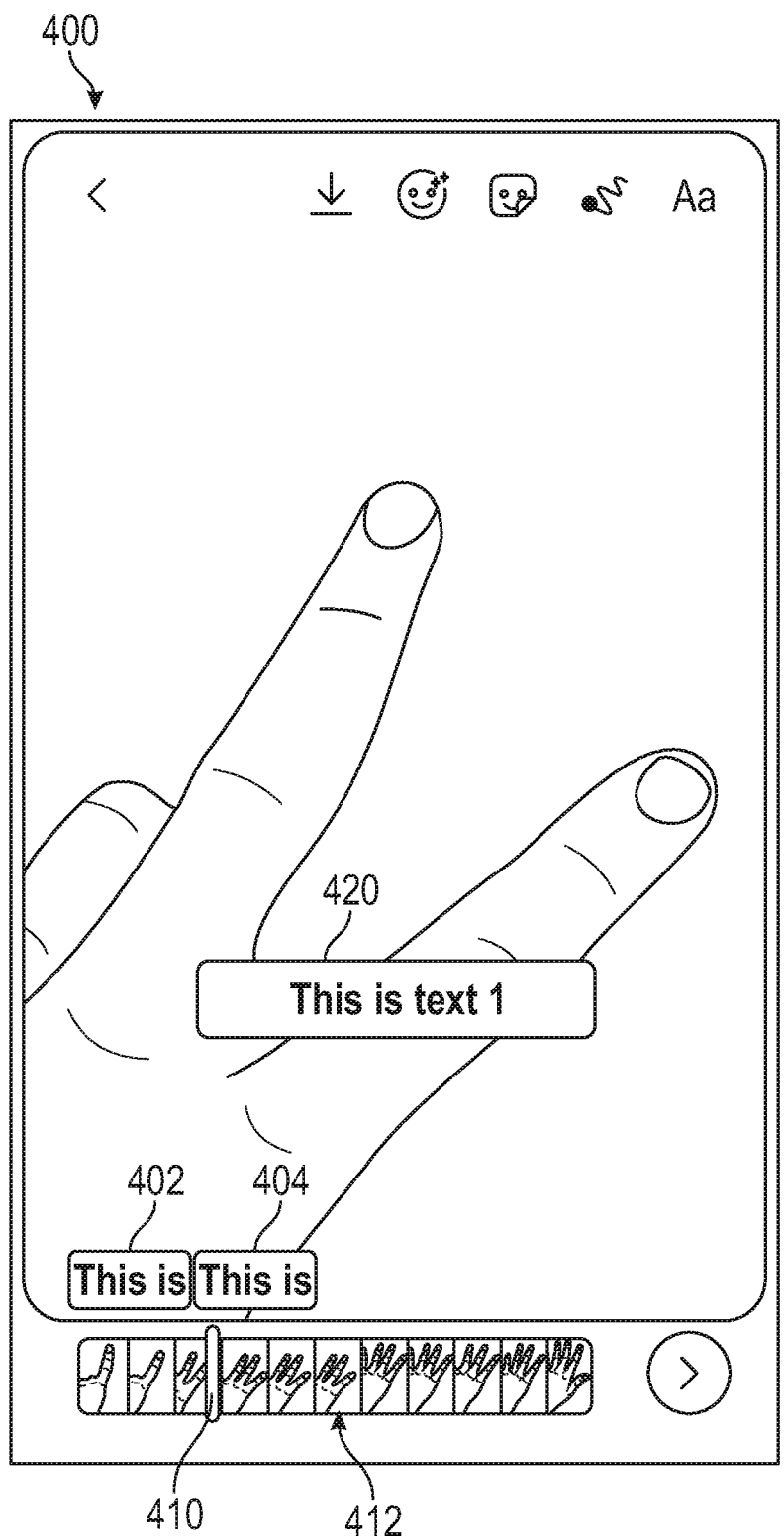
Figure 4C:
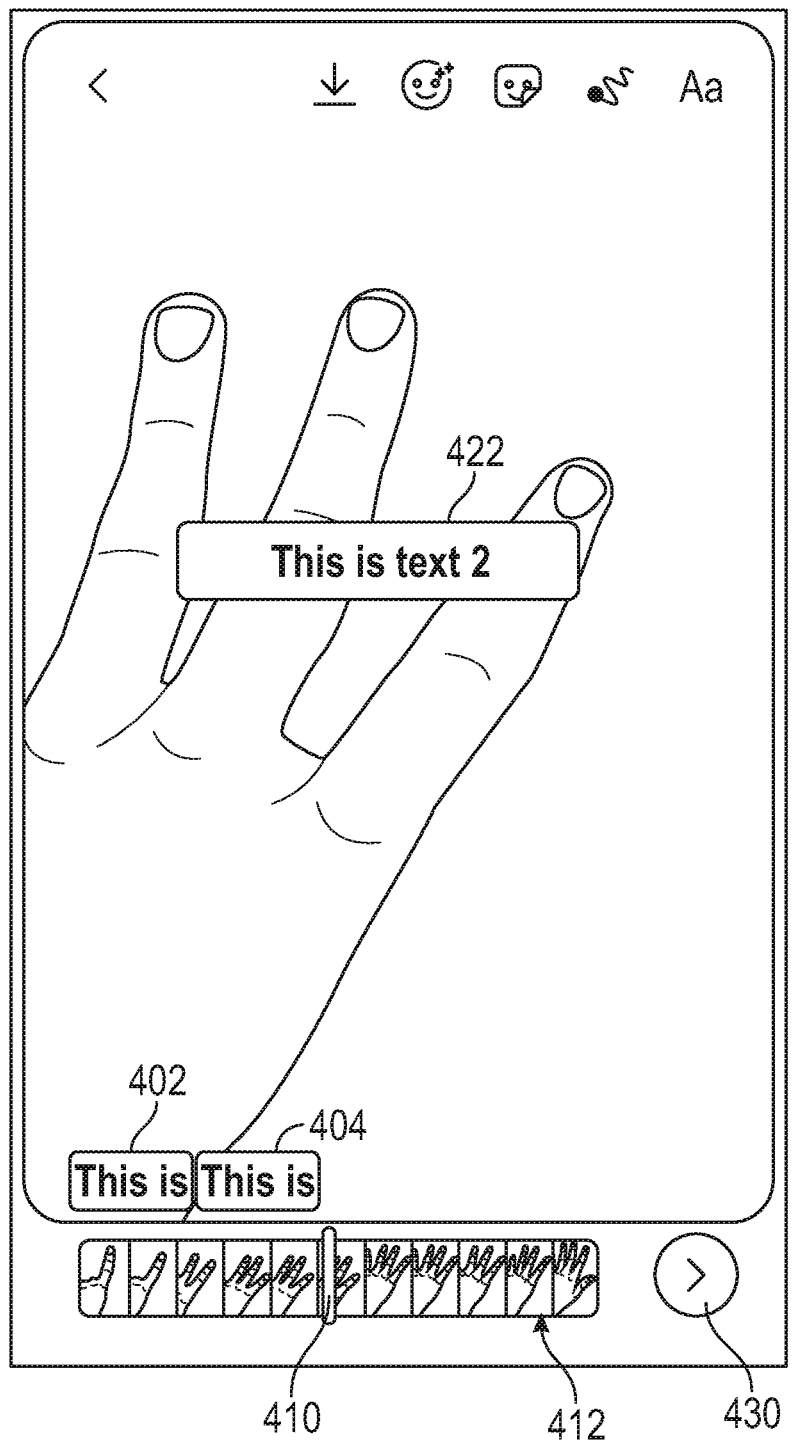

FIGS. 4A-4C illustrate exemplary post-editing playback of a video clip, according to certain aspects of the present disclosure. Referring to FIG. 4A, a post-editing user interface 400 may include a video clip with timed elements added, for example. As illustrated, a first timed element icon 402 and a second timed element icon 404 indicate that two timed elements have been added to the video clip.

According to aspects, the edited video clip may play back continuously in a loop. A user may also slide a scroll bar 410 along a timeline 412 to jump to specific portions of the edited video clip. Alternatively, a user may press and hold a screen of the interface 400 to scroll either forward or backward along the timeline 412.

As shown in FIG. 4B, a first timed element 420 may appear during a first time period. Similarly, as shown in FIG. 4C, a second timed element 422 may appear during a second time period. For example, the first timed element 420 and the second timed element 422 may have been added according to FIGS. 3A-3F above. The first timed element 420 and the second timed element 422 may be further customized, and/or additional timed elements may be added accordingly. Once the user is satisfied, the video clip may be finalized 430 to generate a final video clip. For example, the final video clip includes all of the edited elements as included by the user.

According to aspects, timed elements may be added, edited, and/or deleted according to the above description. In this way, the timed elements may be customized and configured to provide helpful and/or entertaining context to the edited video clip. For example, timed elements may be configured to appear at specific moments on the video clip. The timed elements may also be configured to appear one after another, or in conjunction with each other. Effects such as fading in, fading out, etc., may be added to the timed elements as well to facilitate transitions in timed elements. By allowing for separate timelines (e.g., text timelines 360 and 374) apart from the video timeline (e.g., timeline 330), the timed elements may be customized to a high degree of accuracy in relation to the video clip. This allows for quick and effective editing to be performed at low processing cost.

According to aspects, editing of the video clip as described above may be accomplished through manipulation of virtual videos. For example, the virtual videos may include time ranges that describe data included in each time range to record a time range of what was trimmed/edited. Rather than manipulating the data, markers may point to the time ranges where scrubbing/editing occurs. In this way, the user may preview their edits without having to wait for rendering of the video. Similarly, trimming may be accomplished by recording how much trimming was done to the virtual video. When previewing the trimming, the trimmed portions are skipped over. As a result, virtual videos do not require stitching of the clips because every trim/edit to the video object itself is not touched. Utilizing virtual videos saves on processing power and allows greater flexibility in editing the videos.

Figure 5:
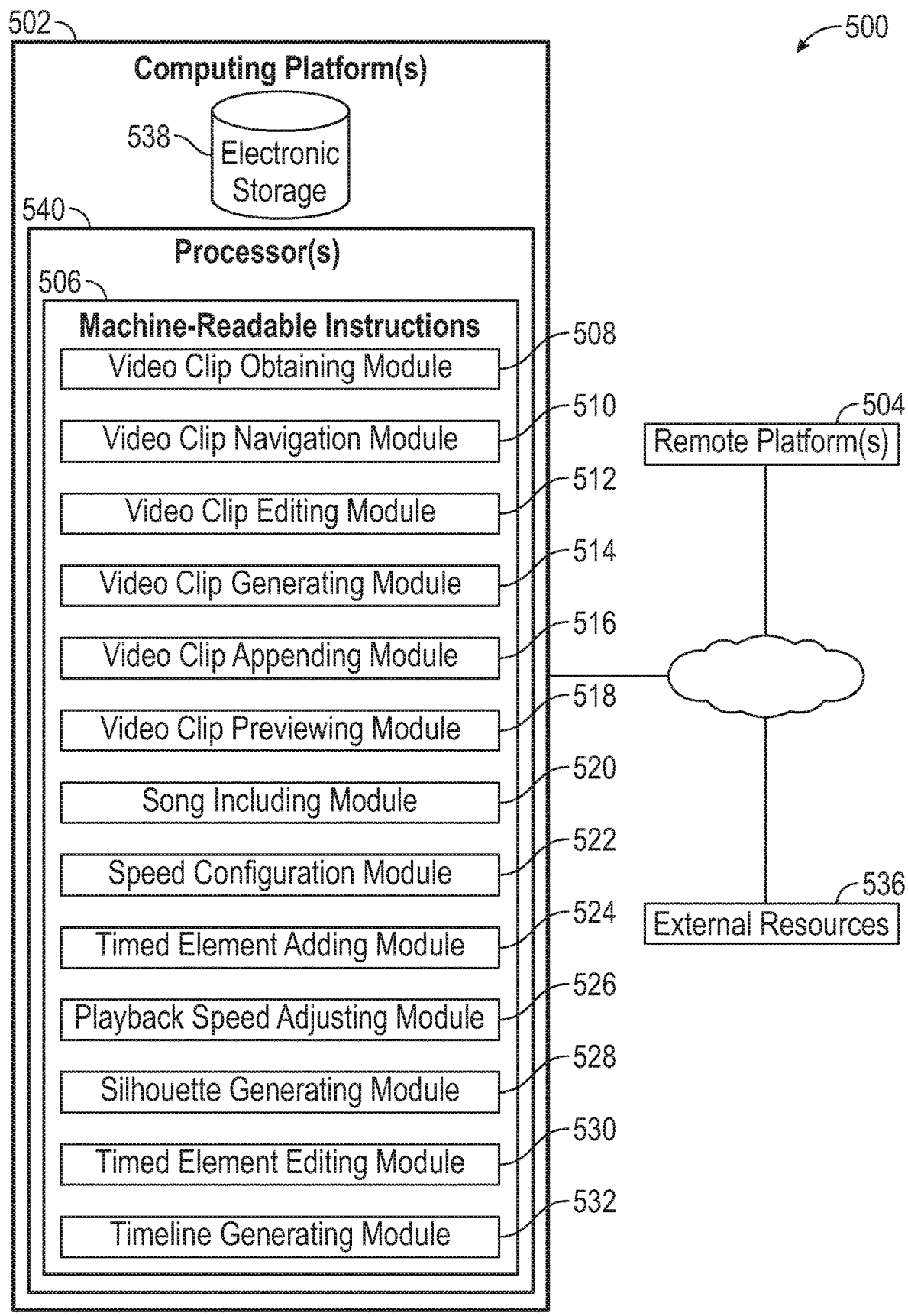
FIG. 5 illustrates a system configured for editing video clips, in accordance with one or more implementations.

FIG. 5 illustrates a system 500 configured for editing video clips, according to certain aspects of the disclosure. In some implementations, the system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of clip obtaining module 508, clip navigation module 510, clip editing module 512, video clip generating module 514, video clip appending module 516, video clip previewing module 518, song including module 520, speed configuration module 522, timed element adding module 524, playback speed adjusting module 526, silhouette generating module 528, time element editing module 530, timeline generating module 532, and/or other instruction modules.

Clip obtaining module 508 may be configured to obtain a latest video clip to be appended to a series of video clips. Obtaining the latest video clip may further include configuring a timed delay for obtaining the latest video clip. Editing the latest video clip may further include deleting the latest video clip. Navigating back may further include toggling an icon including a thumbnail view of the latest video clip. Each video clip of the series of video clips are obtained independently of each other.

Clip navigation module 510 may be configured to, prior to obtaining a next video clip, navigate back to the latest video clip. Clip editing module 512 may be configured to edit the latest video clip through a timeline. The timeline may include thumbnails of the latest video clip. Editing the latest video clip may include adjustments to the latest video clip. The adjustments may include trimming of the latest video clip. The trimming may be from both a beginning and an ending of the latest video clip. Trimmed portions may appear grayed out.

Video clip generating module 514 may be configured to generate an edited video clip based on edits to the latest video clip. Video clip generating module 514 may be configured to generate a final video clip based on the combining. Video clip appending module 516 may be configured to append the edited video clip to the series of video clips. Video clip previewing module 518 may be configured to preview the video clip.

Song including module 520 may be configured to include a song. The song may include visual beats. Speed configuration module 522 may be configured to configure a recording speed for each video clip. Timed element adding module 524 may be configured to add a timed element to a video clip. Playback speed adjusting module 526 may be configured to adjust a playback speed of the video clip from the digital photo album. Silhouette generating module 528 may be configured to generate a silhouette based on the latest video clip. Timed element editing module 530 may be configured to edit a timed element. Timeline generating module 532 may be configured to generate a timeline(s).

In some implementations, computing platform(s) 502, remote platform(s) 504, and/or external resources 536 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 536 may be operatively linked via some other communication media.

A given remote platform 504 may include one or more processors configured to execute computer program modules. The computer program modules may be configured to enable an expert or user associated with the given remote platform 504 to interface with system 500 and/or external resources 536, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 536 may include sources of information outside of system 500, external entities participating with system 500, and/or other resources. In some implementations, some or all of the functionality attributed herein to external resources 536 may be provided by resources included in system 500.

Computing platform(s) 502 may include electronic storage 538, one or more processors 540, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 538 may comprise non-transitory storage media that electronically stores information. The electronic storage media of electronic storage 538 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 538 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 538 may include one or more virtual storage resources (e.g., cloud storage, a virtual private network, and/or other virtual storage resources). Electronic storage 538 may store software algorithms, information determined by processor(s) 540, information received from computing platform(s) 502, information received from remote platform(s) 504, and/or other information that enables computing platform(s) 502 to function as described herein.

Processor(s) 540 may be configured to provide information processing capabilities in computing platform(s) 502. As such, processor(s) 540 may include one or more of a digital processor, an analog processor, a digital circuit designed to process information, an analog circuit designed to process information, a state machine, and/or other mechanisms for electronically processing information. Although processor(s) 540 is shown in FIG. 5 as a single entity, this is for illustrative purposes only. In some implementations, processor(s) 540 may include a plurality of processing units. These processing units may be physically located within the same device, or processor(s) 540 may represent processing functionality of a plurality of devices operating in coordination. Processor(s) 540 may be configured to execute modules 508, 510, 512, 514, 516, 518, 520, 522, 524, 526, 528, 530, and/or 532, and/or other modules. Processor(s) 540 may be configured to execute modules 508, 510, 512, 514, 516, 518, 520, 522, 524, 526, 528, 530, and/or 532, and/or other modules by software; hardware; firmware; some combination of software, hardware, and/or firmware; and/or other mechanisms for configuring processing capabilities on processor(s) 540. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, 522, 524, 526, 528, 530, and/or 532 are illustrated in FIG. 5 as being implemented within a single processing unit, in implementations in which processor(s) 540 includes multiple processing units, one or more of modules 508, 510, 512, 514, 516, 518, 520, 522, 524, 526, 528, 530, and/or 532 may be implemented remotely from the other modules. The description of the functionality provided by the different modules 508, 510, 512, 514, 516, 518, 520, 522, 524, 526, 528, 530, and/or 532 described below is for illustrative purposes, and is not intended to be limiting, as any of modules 508, 510, 512, 514, 516, 518, 520, 522, 524, 526, 528, 530, and/or 532 may provide more or less functionality than is described. For example, one or more of modules 508, 510, 512, 514, 516, 518, 520, 522, 524, 526, 528, 530, and/or 532 may be eliminated, and some or all of its functionality may be provided by other ones of modules 508, 510, 512, 514, 516, 518, 520, 522, 524, 526, 528, 530, and/or 532. As another example, processor(s) 540 may be configured to execute one or more additional modules that may perform some or all of the functionality attributed below to one of modules 508, 510, 512, 514, 516, 518, 520, 522, 524, 526, 528, 530, and/or 532.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
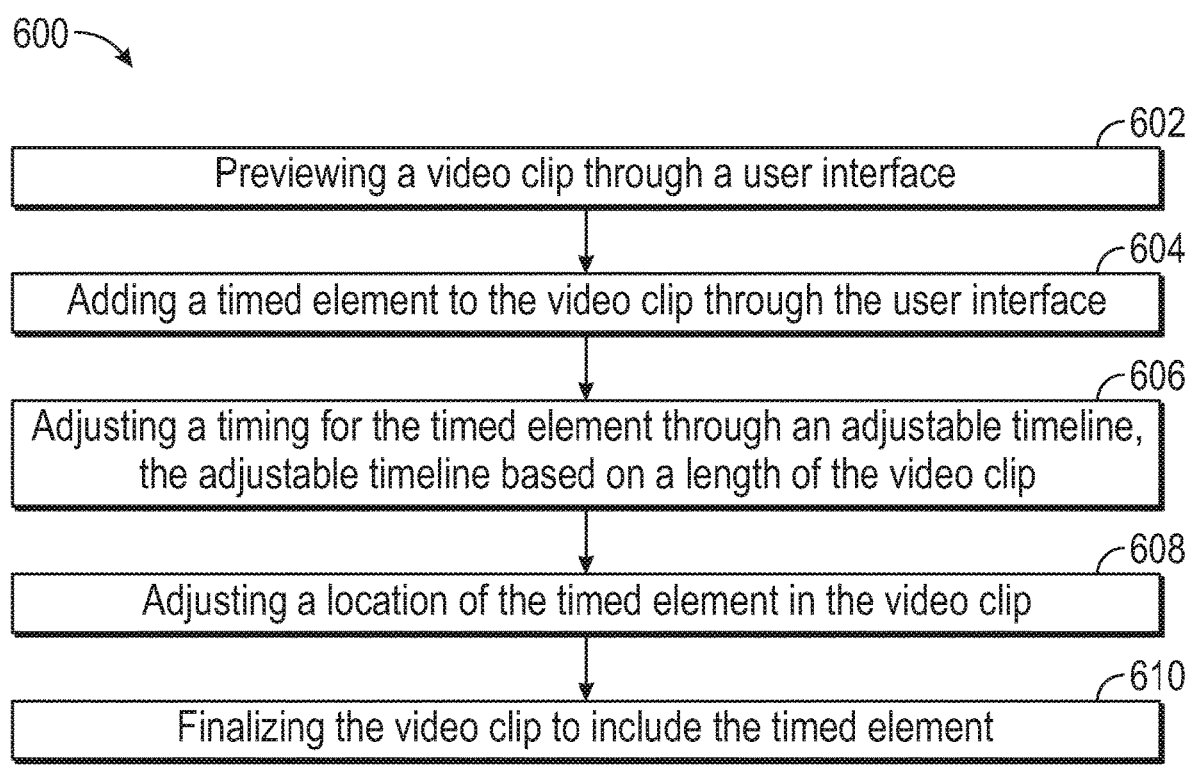
FIG. 6 illustrates an example flow diagram for editing video clips, according to certain aspects of the disclosure.

FIG. 6 illustrates an example flow diagram (e.g., process 600) for granting access to a game, according to certain aspects of the disclosure. For explanatory purposes, the example process 600 is described herein with reference to FIGS. 1-5. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-5.

At step 602, a video clip is previewed through a user interface. At step 604, a timed element is added to the video clip through the user interface. At step 606, a timing is adjusted for the timed element through an adjustable timeline, the adjustable timeline based on a length of the video clip. At step 608, a location of the timed element is adjusted in the video clip. At step 610, the video clip is finalized to include the timed element.

For example, as described above in relation to FIGS. 3-5, at step 602, a video clip is previewed (e.g., through video clip previewing module 518) via a user interface 300. At step 604, a timed element is added (e.g., through timed element adding module 524) to the video clip via the user interface 300. At step 606, a timing is adjusted for the timed element through an adjustable timeline (e.g., text timelines 360 and 374), the adjustable timeline based on a length of the video clip. At step 608, a location of the timed element is adjusted in the video clip, as shown in FIG. 3D. At step 610, the video clip is finalized to include the timed element, as shown in FIGS. 4A-4C.

According to an aspect, the video clip comprises a series of video clips obtained independently of each other. According to an aspect, the timed element comprises at least one of text, a sticker, an animation, a picture, music, or an effect. According to an aspect, the timeline comprises thumbnails of the video clip.

According to an aspect, adjusting the location further comprises selecting the timed element, and dragging the timed element to a desired location. According to an aspect, the process 600 further includes adding visual effects based on background audio of the video clip.

According to an aspect, the process 600 further includes recording a path of the timed element, and adding movement to the timed element based on the path.

Figure 7:
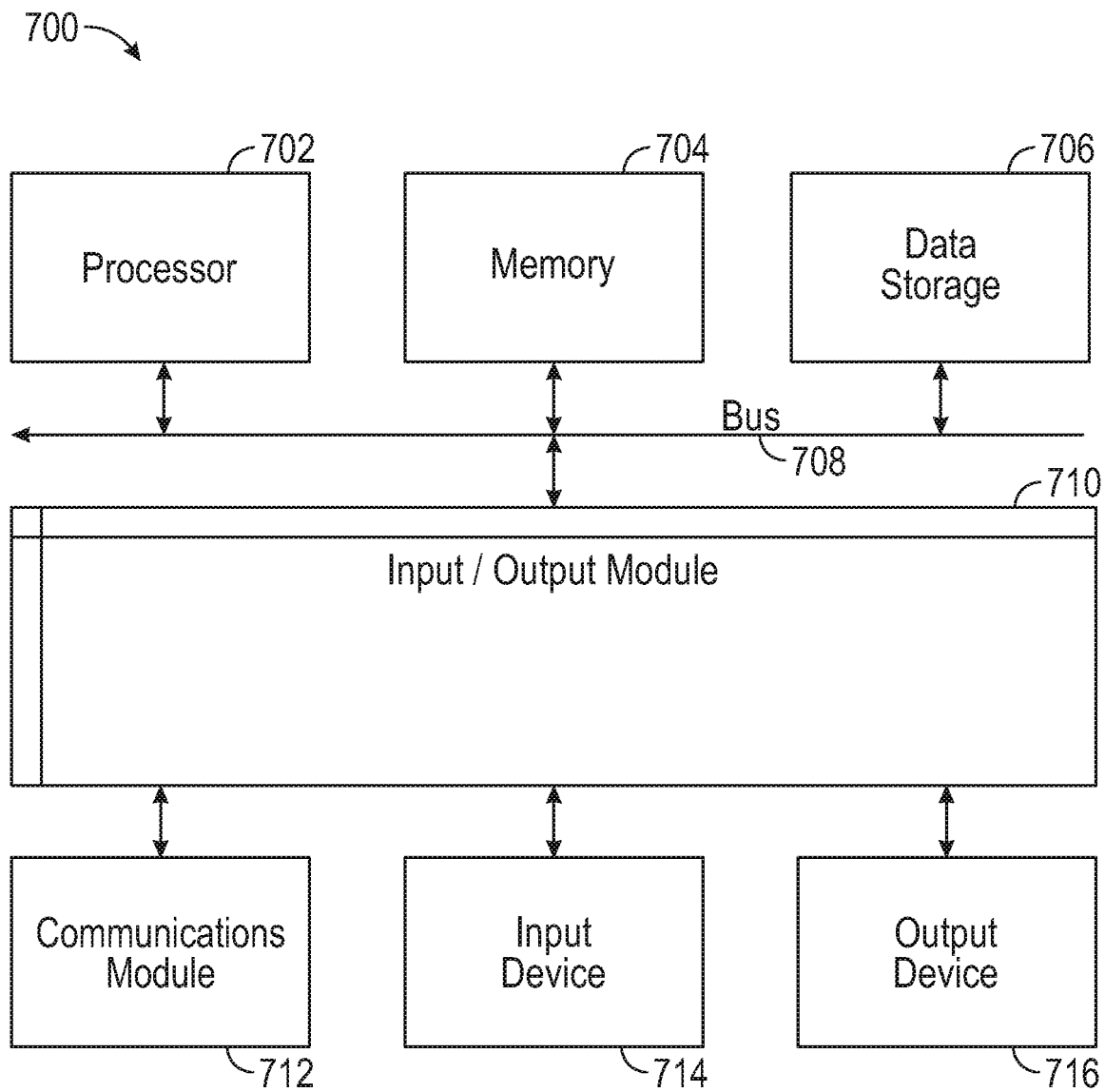
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for editing video clips for sharing through a social media application, comprising:
   displaying a preview of a video clip through a user interface;
   adding a timed element to the video clip through the user interface, the timed element comprising at least one of a sticker, an animation, a picture, or music, the music comprising a song;
   displaying a title and artist for the song;
   receiving a selection of a portion of the song to use for the timed element;
   displaying beats and lyrics of the song for the portion of the song;
   adjusting a timing for the timed element based on the beats and the lyrics of the song through an adjustable timeline of a video timeline, the adjustable timeline based on a length of the video clip and overlapping with the video timeline, the adjustable timeline comprising a first end and a second end, wherein the timed element appears during portions of the video clip between the first end and the second end;
   displaying the timed element as see-through during a non-selected range of the timing, the non-selected range comprising portions of the video clip before the first end or after the second end;
   adjusting a location of the timed element in the video clip in relation to a centerline; and
   finalizing the video clip to include the timed element.

2. The computer-implemented method of claim 1, wherein the video clip comprises a series of video clips.

3. The computer-implemented method of claim 1, wherein the timed element comprises at least one of text or an effect.

4. The computer-implemented method of claim 1, wherein the adjustable timeline comprises thumbnails of the video clip.

5. The computer-implemented method of claim 1, wherein adjusting the location further comprises:
   selecting the timed element; and
   dragging the timed element to a desired location.

6. The computer-implemented method of claim 1, further comprising:
   adding visual effects based on background audio of the video clip.

7. The computer-implemented method of claim 1, further comprising:
   recording a path of the timed element; and
   adding movement to the timed element based on the path.

8. A system for editing video clips, comprising:
   a processor; and
   a memory comprising instructions stored thereon, which when executed by the processor, causes the processor to perform:
      displaying a preview of a video clip through a user interface;
      adding a timed element to the video clip through the user interface, the timed element comprising at least one of a sticker, an animation, a picture, or music, the music comprising a song;
      displaying a title and artist for the song;
      receiving a selection of a portion of the song to use for the timed element;
      displaying beats and lyrics of the song for the portion of the song;
      adjusting a timing for the timed element based on the beats and the lyrics of the song through an adjustable timeline of a video timeline, the adjustable timeline based on a length of the video clip and overlapping with the video timeline, the adjustable timeline comprising a first end and a second end, wherein the timed element appears during portions of the video clip between the first end and the second end;
      displaying the timed element as see-through during a non-selected range of the timing, the non-selected range comprising portions of the video clip before the first end or after the second end;
      adjusting a location of the timed element in the video clip in relation to a centerline; and
      finalizing the video clip to include the timed element.

9. The system of claim 8, wherein the video clip comprises a series of video clips.

10. The system of claim 8, wherein the timed element comprises at least one of text or an effect.

11. The system of claim 8, wherein the adjustable timeline comprises thumbnails of the video clip.

12. The system of claim 8, further comprising stored sequences of instructions, which when executed by the processor, cause the processor to perform:
   selecting the timed element; and
   dragging the timed element to a desired location.

13. The system of claim 8, further comprising stored sequences of instructions, which when executed by the processor, cause the processor to perform:
   adding visual effects based on background audio of the video clip.

14. The system of claim 8, further comprising stored sequences of instructions, which when executed by the processor, cause the processor to perform:
   recording a path of the timed element; and
   adding movement to the timed element based on the path.

15. A non-transitory computer-readable storage medium comprising instructions stored thereon, which when executed by one or more processors, cause the one or more processors to perform operations for editing video clips, the operations comprising:
   displaying a preview of a video clip through a user interface;

adding a timed element to the video clip through the user interface, the timed element comprising at least one of a sticker, an animation, a picture, or music, the music comprising a song;

displaying a title and artist for the song;

receiving a selection of a portion of the song to use for the timed element;

displaying beats and lyrics of the song for the portion of the song;

adjusting a timing for the timed element based on the beats and the lyrics of the song through an adjustable timeline of a video timeline, the adjustable timeline based on a length of the video clip and overlapping with the video timeline, the adjustable timeline comprising a first end and a second end, wherein the timed element appears during portions of the video clip between the first end and the second end;

displaying the timed element as see-through during a non-selected range of the timing, the non-selected range comprising portions of the video clip before the first end or after the second end;

adjusting a location of the timed element in the video clip in relation to a centerline; and finalizing the video clip to include the timed element.

16. The non-transitory computer-readable storage medium of claim 15, wherein the video clip comprises a series of video clips.

17. The non-transitory computer-readable storage medium of claim 15, wherein the timed element comprises at least one of text or an effect.

18. The non-transitory computer-readable storage medium of claim 15, wherein the adjustable timeline comprises thumbnails of the video clip.

* * * * *